United States Patent
Suzuki et al.

(10) Patent No.: US 11,432,031 B2
(45) Date of Patent: Aug. 30, 2022

(54) CONTENT PLAYBACK PROGRAM, CONTENT PLAYBACK METHOD, AND CONTENT PLAYBACK SYSTEM

(71) Applicant: EVIXAR INC., Tokyo (JP)

(72) Inventors: Hisaharu Suzuki, Tokyo (JP); Yasuhiko Nagatomo, Tokyo (JP); Atsushi Takigawa, Tokyo (JP)

(73) Assignee: Evixar Inc., Tokyo (JP)

( * ) Notice: Subject to any disclaimer, the term of this patent is extended or adjusted under 35 U.S.C. 154(b) by 0 days.

(21) Appl. No.: 16/970,274

(22) PCT Filed: Feb. 23, 2018

(86) PCT No.: PCT/JP2018/006667
§ 371 (c)(1),
(2) Date: Aug. 14, 2020

(87) PCT Pub. No.: WO2019/163085
PCT Pub. Date: Aug. 29, 2019

(65) Prior Publication Data
US 2021/0144433 A1 May 13, 2021

(51) Int. Cl.
*H04N 21/43* (2011.01)
*H04N 21/2187* (2011.01)
(Continued)

(52) U.S. Cl.
CPC ... *H04N 21/43072* (2020.08); *H04N 21/2187* (2013.01); *H04N 21/23892* (2013.01); *H04N 21/8358* (2013.01); *H04N 21/8547* (2013.01)

(58) Field of Classification Search
CPC ......... H04N 21/43072; H04N 21/2187; H04N 21/23892; H04N 21/8358; H04N 21/8547
(Continued)

(56) References Cited

U.S. PATENT DOCUMENTS 7,395,211 B2 * 7/2008 Watson ................ H04N 19/467
704/500
8,363,161 B2 * 1/2013 Pearlstein .......... H04N 21/4341
348/515
(Continued)

FOREIGN PATENT DOCUMENTS

| JP | 2015061112 A | 3/2015 |
| JP | 2018005071 A | 1/2018 |
| WO | WO 2018/008383 A1 | 1/2018 |

OTHER PUBLICATIONS

European search opinion and Supplementary European Search report issued by European Patent Office in corresponding to European Application No. 18/906,946, dated Sep. 27, 2021 (6 pages).

*Primary Examiner* — John W Miller
*Assistant Examiner* — Sean N. Haiem
(74) *Attorney, Agent, or Firm* — Finnegan, Henderson, Farabow, Garrett & Dunner, LLP

(57) ABSTRACT

It is an object of the present invention to play back other content on any timing without being restricted to the embedded timing of watermark data embedded in the content even when the progress time of the content fluctuates. The content playback program in the present invention causes a computer to realize: a first table for associating and storing a synchronization point ID embedded as watermark data with a scheduled timing for the synchronization point based on a synchronization reference timing for the main content; a second table for storing a scheduled start timing for first sub-content based on the synchronization reference timing; a detection function for detecting the synchronization point ID embedded as watermark data from second sub-content played back based on the progress of the main content; an acquisition function for acquiring the scheduled timing for the synchronization point based on the detected synchronization point ID and the first table, and acquiring the differ- (Continued)

ence between the scheduled timing of the acquired synchronization point and the detection timing for the synchronization point ID based on the synchronization reference timing; a determination function for determining a start timing for the first sub-content based on the acquired difference and the second table; and a control function for controlling playback of the first sub-content based on the determined start timing for the first sub-content.

10 Claims, 12 Drawing Sheets

(51) Int. Cl.
  *H04N 21/2389* (2011.01)
  *H04N 21/8358* (2011.01)
  *H04N 21/8547* (2011.01)
(58) Field of Classification Search
  USPC ............................... 348/515; 725/18, 32, 25
  See application file for complete search history.

(56) References Cited

U.S. PATENT DOCUMENTS

| | | | |
|---|---|---|---|
| 2004/0024588 A1* | 2/2004 | Watson | G06T 1/0028 704/200.1 |
| 2004/0078338 A1* | 4/2004 | Ohta | G06F 21/10 705/51 |
| 2007/0276670 A1* | 11/2007 | Pearlstein | H04N 21/4341 704/270 |
| 2014/0020009 A1* | 1/2014 | Oh | H04N 21/478 725/25 |
| 2014/0088742 A1* | 3/2014 | Srinivasan | H04H 60/372 700/94 |
| 2015/0020094 A1* | 1/2015 | Moon | H04N 21/4828 725/32 |
| 2015/0163563 A1* | 6/2015 | An | H04N 21/435 725/18 |
| 2016/0050468 A1* | 2/2016 | Morten | H04N 21/433 725/28 |
| 2016/0055606 A1 | 2/2016 | Petrovic et al. | |

\* cited by examiner

[FIG. 1]
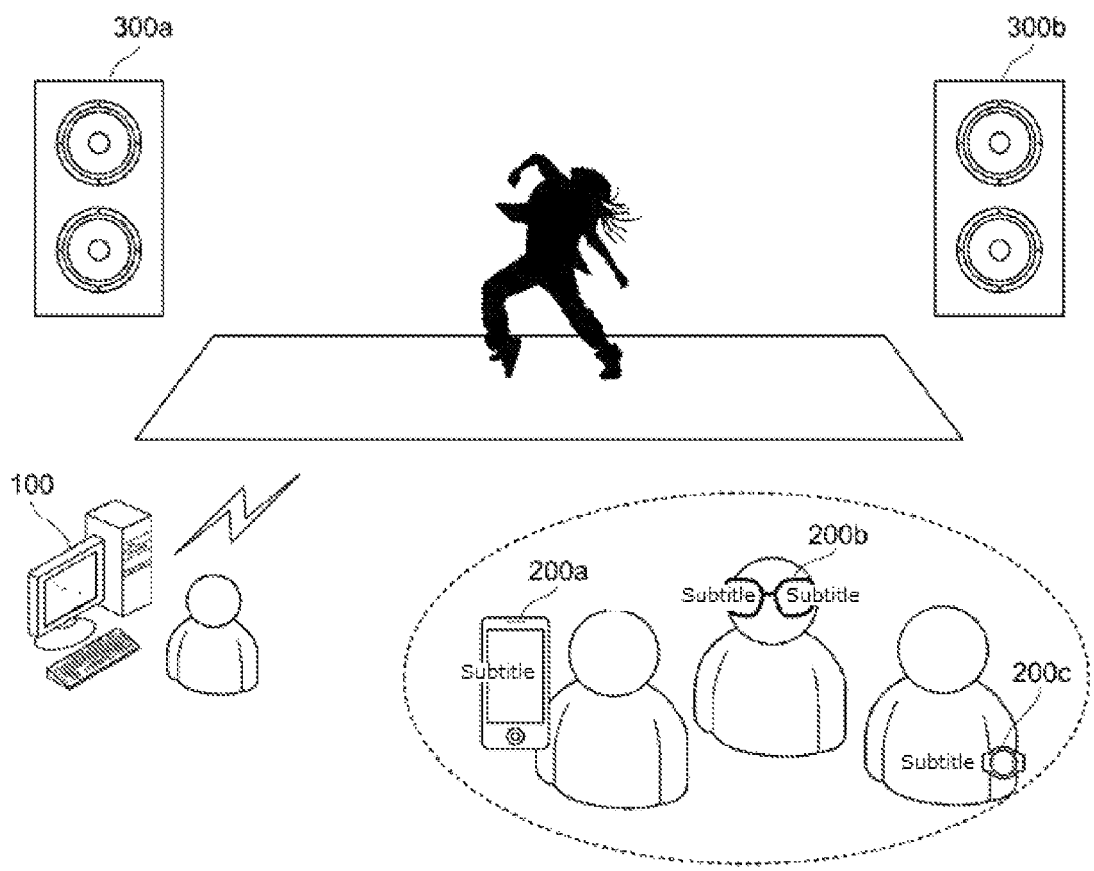

[FIG. 2]
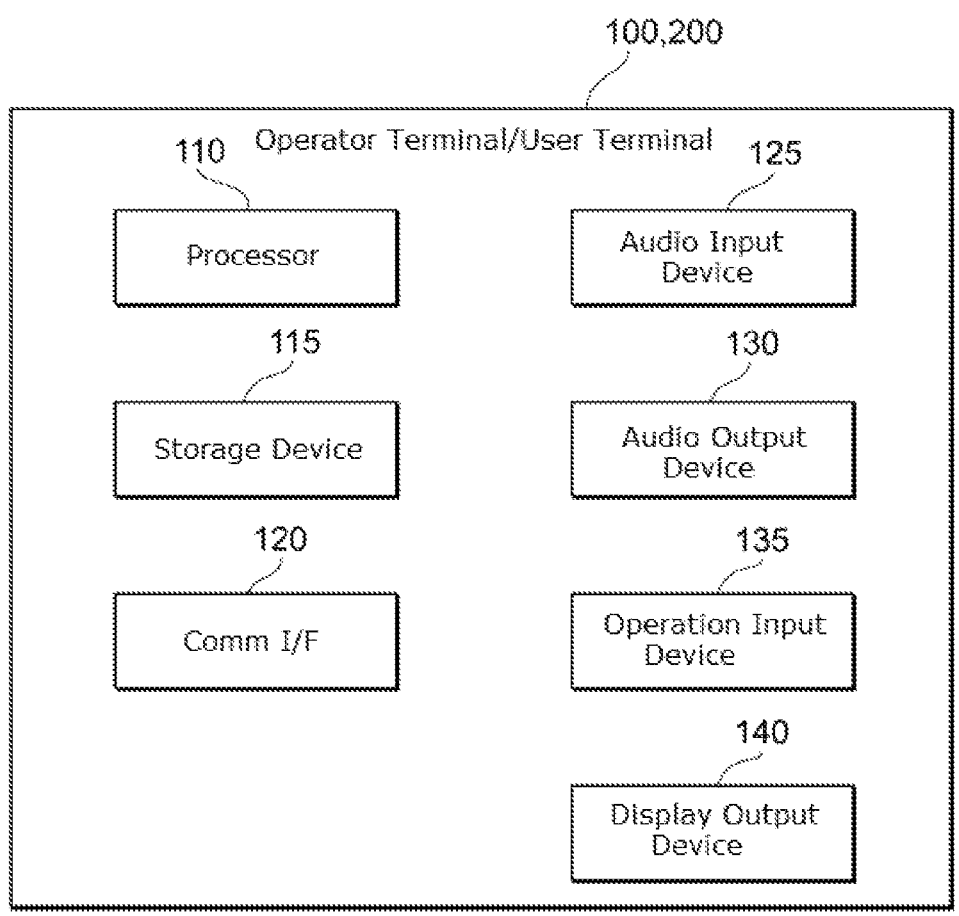

[FIG. 3]
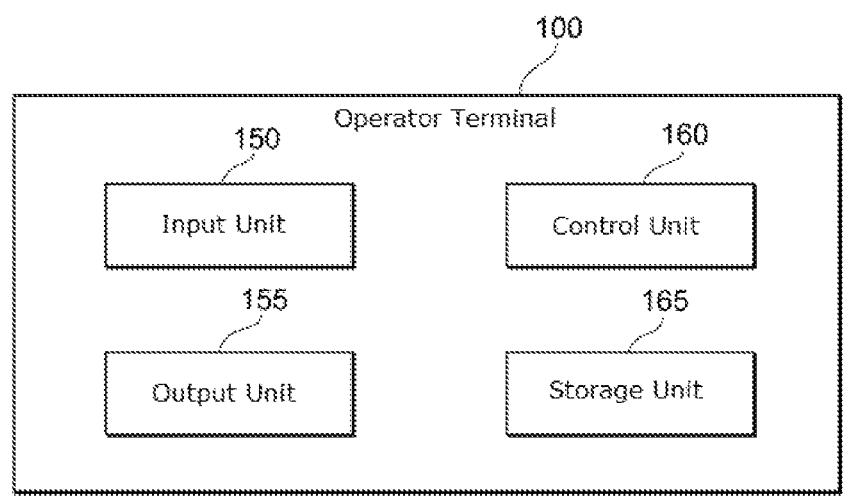

[FIG. 4]
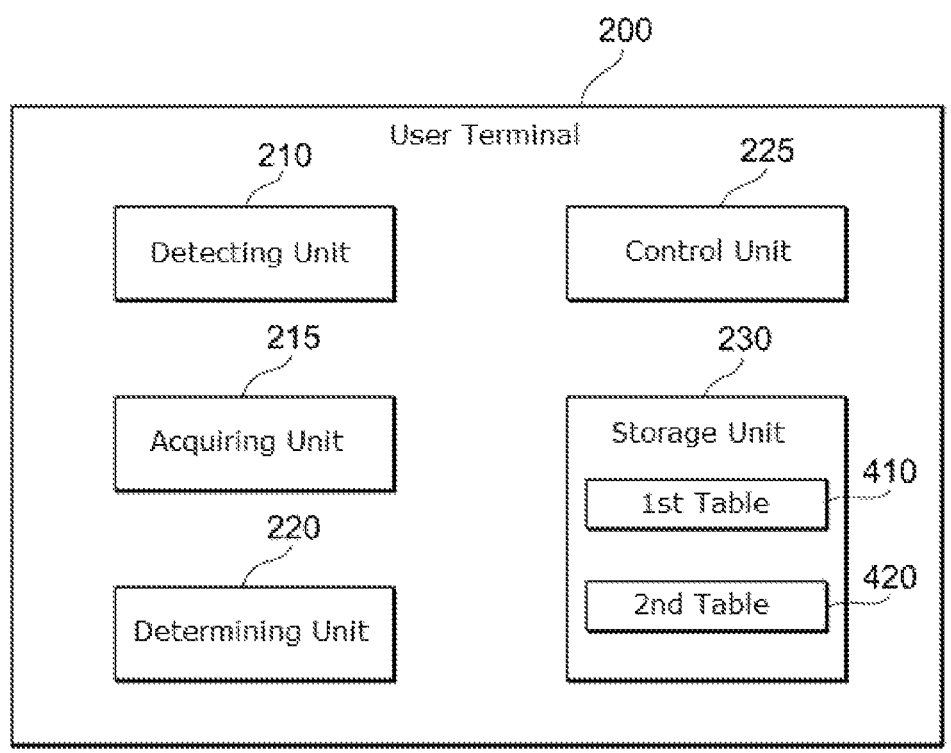

[FIG. 5]
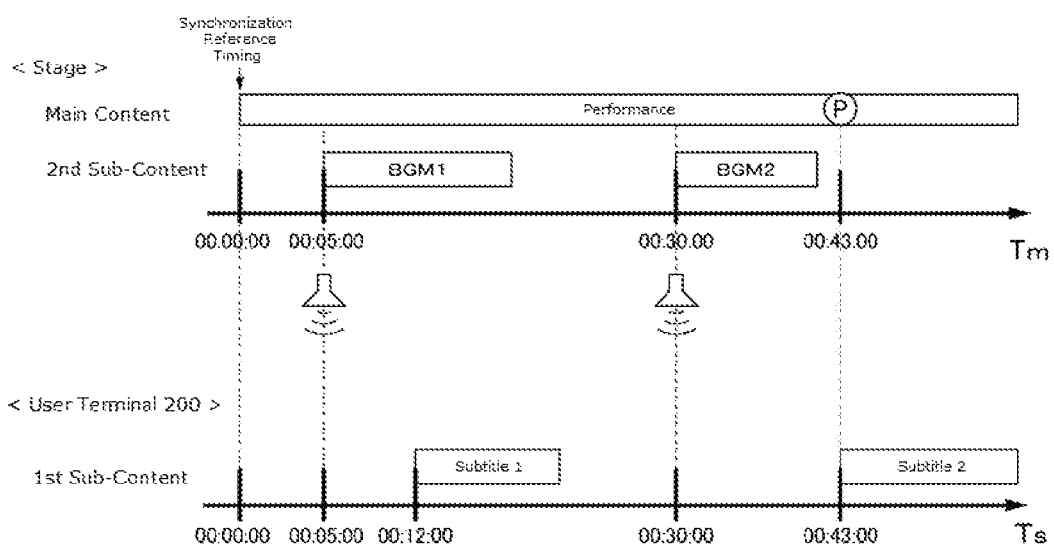

[FIG. 6]
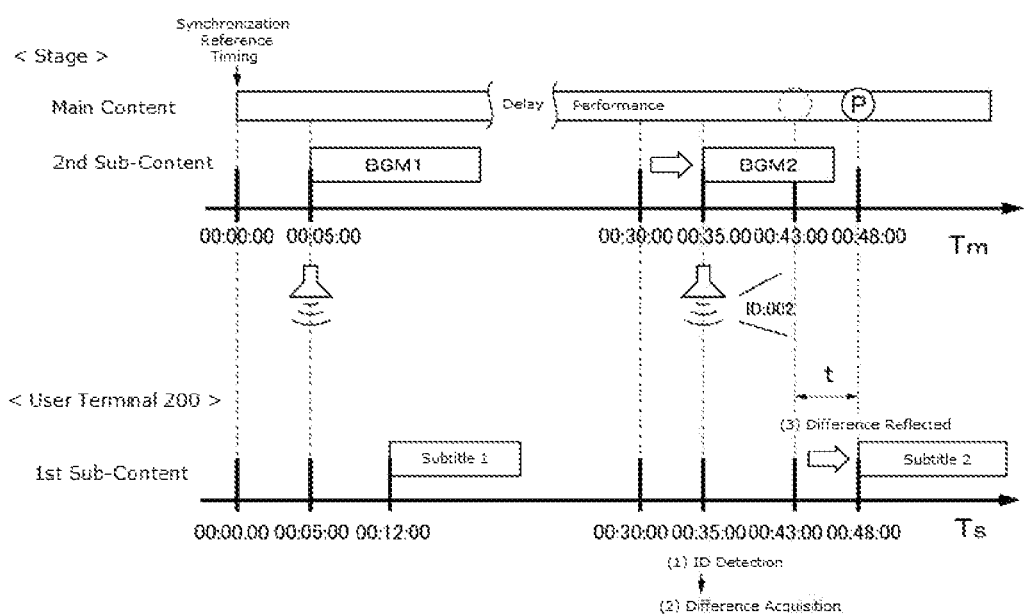

[FIG. 7]

| 001 | 00:05:00 |
|-----|----------|
| 002 | 00:35:00 |
| 003 | 00:55:00 |
| :   | :        |

410 / 412 / 414

| 00:12:00 | Subtitle 1 |
|----------|------------|
| 00:43:00 | Subtitle 2 |
| 00:45:00 | Video 1    |
| 01:05:00 | Subtitle 3 |
| :        | :          |

420 / 422 / 424

[FIG. 8]
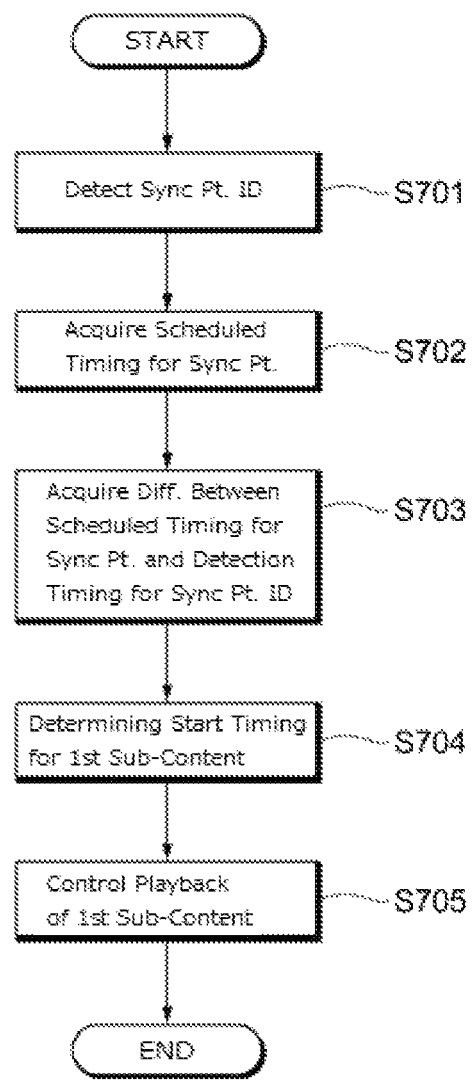

[FIG. 9]
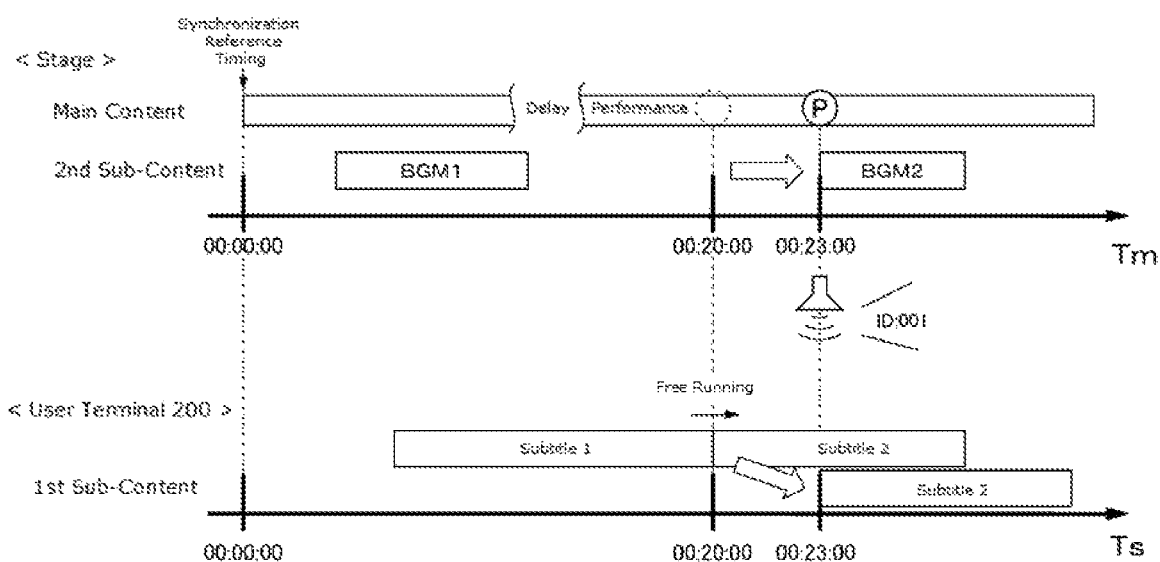

[FIG. 10]
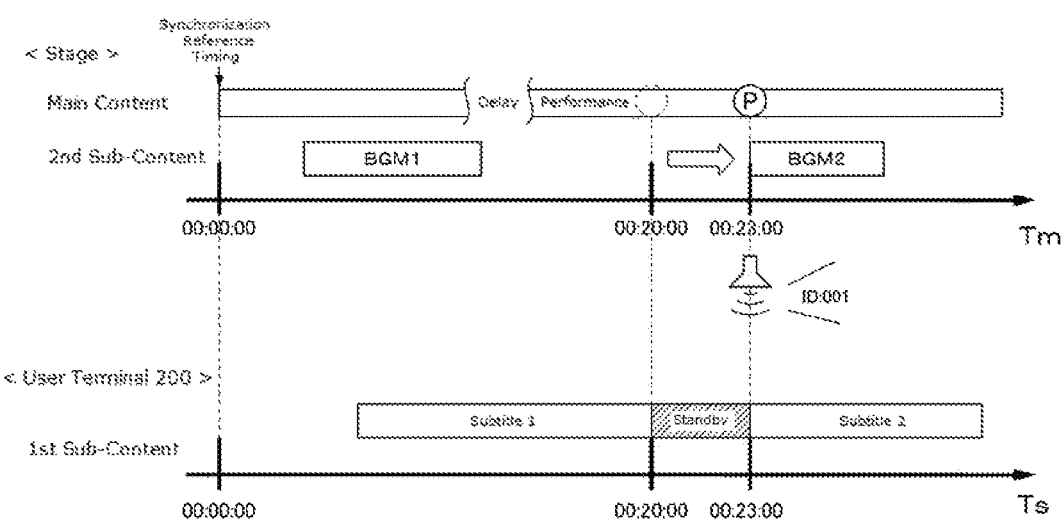

[FIG. 11]
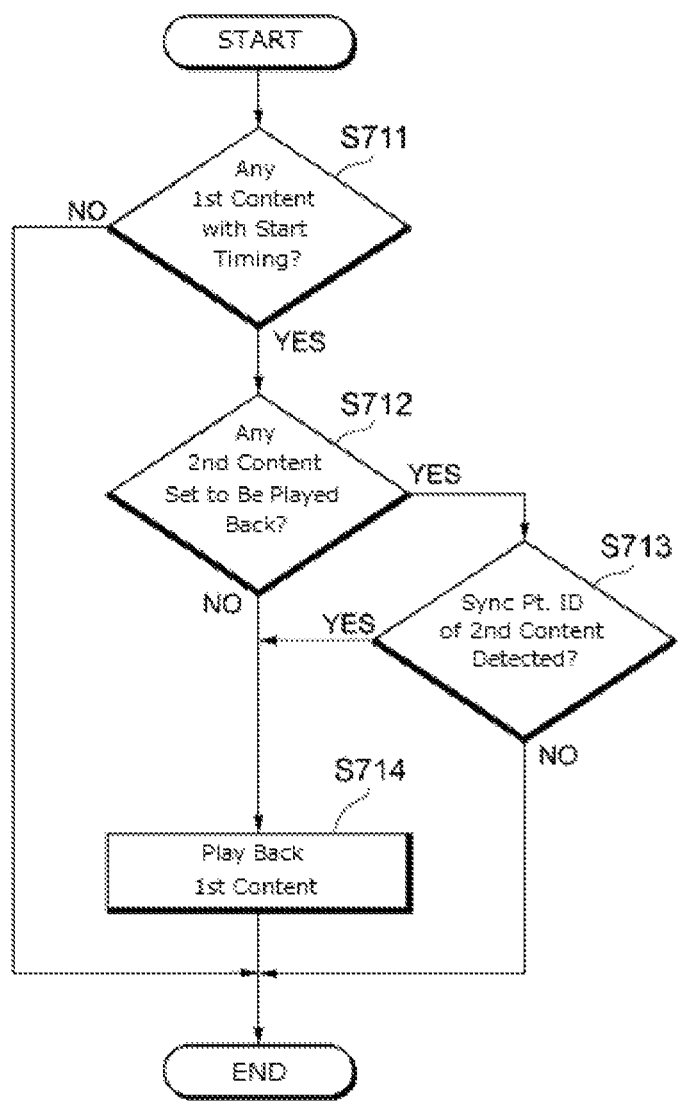

[FIG. 12]
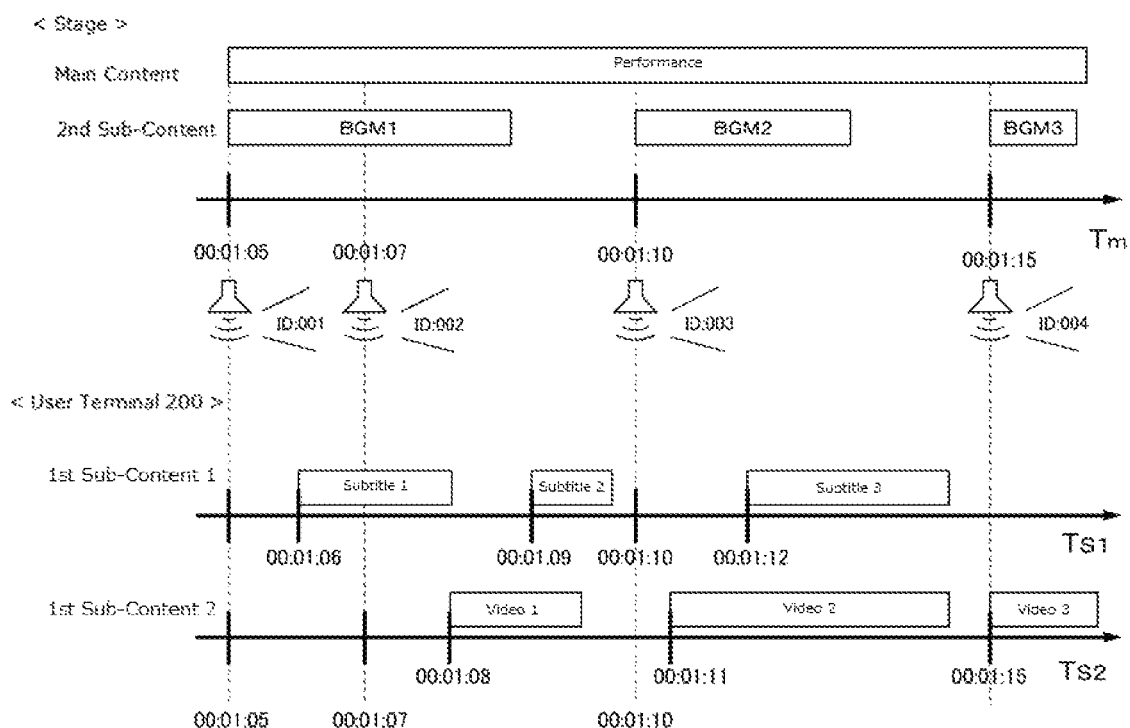

CONTENT PLAYBACK PROGRAM, CONTENT PLAYBACK METHOD, AND CONTENT PLAYBACK SYSTEM

CROSS-REFERENCE TO RELATED PATENT APPLICATIONS

This application is a national stage filing under 35 U.S.C. § 371 of International Application No. PCT/JP2018/006667, filed Feb. 23, 2018, the contents of which are incorporated herein by reference in its entirety.

TECHNICAL FIELD

The present invention relates to a content playback program, content playback method, and content playback system.

BACKGROUND ART

Many services have arisen in recent years that comprehensively produce events by allowing various types of content, such as video and music, to be played back on a plurality of devices. In these services, the progress of each type of content has to be synchronized between the devices. In the synchronization process, for example, the playback timing for sub-content is set beforehand in certain devices in order to align various types of sub-content with content such as the main performance (the "main content") and each of the items of sub-content is played back at the set timing.

However, in live performances where actors and singers appear on stage, the progress time of the live performance may fluctuate with each performance. As a result, it is difficult to preset the playback timing for sub-content such as background music (BGM) to align with main content that is a live performance.

A method has been proposed in Patent Document 1 to address this problem for main content such as video accompanied by audio and sub-content such as second screen information on the video (subtitles, etc.) in which the second screen information is outputted to a mobile device based on the progress of the video.

In this disclosed method, electronic watermarking technology is used to embed identification information for second screen information associated with each scene in the video as watermark data in the audio for the video, which is outputted along with the audio for the video. In the mobile device, data for second screen information is associated and stored with this identification information so that, when audio for the video is inputted to the mobile device, the watermark data can be detected and the second screen information synchronized with the video scene can be outputted. Here, "watermark technology" refers to any technology used to embed specific information as watermark data in sound for video or music content.

This method can be used to embed watermark data in sub-content such as background music sent along with a live performance such as actors or singers performing on stage even though the progress time for live performances fluctuates so that separate sub-content such as second screen information is outputted based on the progress of the main content.

PRIOR ART DOCUMENTS

Patent Documents

Patent Document 1: JP 2015-61112 A

SUMMARY OF THE INVENTION

Problem Solved by the Invention

However, the method disclosed in Patent Document 1 associates watermark data embedded in each video scene with identification information for second screen information based on a 1:1 correspondence. As a result, second screen information can only be outputted for each video scene based on the timing of the embedded watermark data. This creates a problem in which second screen information such as subtitles cannot be outputted on the timing in the beginning, middle and end of each video scene which is unrelated to the timing of the embedded watermark data.

Therefore, it is an object of the present invention to provide a content playback program, content playback method, and content playback system for playing back other content on any timing without being restricted to the embedded timing of watermark data embedded in the content even when the progress time of the content fluctuates.

Means of Solving the Problem

One aspect of the present invention is a content playback program causing a computer to realize: a first table for associating and storing a synchronization point ID embedded as watermark data with a scheduled timing for the synchronization point based on a synchronization reference timing for the main content; a second table for storing a scheduled start timing for first sub-content based on the synchronization reference timing; a detection function for detecting the synchronization point ID embedded as watermark data from second sub-content played back based on the progress of the main content; an acquisition function for acquiring the scheduled timing for the synchronization point based on the detected synchronization point ID and the first table, and acquiring the difference between the scheduled timing of the acquired synchronization point and the detection timing for the synchronization point ID based on the synchronization reference timing; a determination function for determining a start timing for the first sub-content based on the acquired difference and the second table; and a control function for controlling playback of the first sub-content based on the determined start timing for the first sub-content.

Another aspect of the present invention is a content playback method comprising the steps of: associating and storing a synchronization point ID embedded as watermark data with a scheduled timing for the synchronization point based on a synchronization reference timing for the main content in a first table; storing a scheduled start timing for first sub-content based on the synchronization reference timing in a second table; detecting the synchronization point ID embedded as watermark data from second sub-content played back based on the progress of the main content; acquiring the scheduled timing for the synchronization point based on the detected synchronization point ID and the first table, and acquiring the difference between the scheduled timing of the acquired synchronization point and the detection timing for the synchronization point ID based on the synchronization reference timing; determining a start timing for the first sub-content based on the acquired difference and the second table; and controlling playback of the first sub-content based on the determined start timing for the first sub-content.

Another aspect of the present invention is a content playback system having a user terminal and an operator terminal, wherein the user terminal comprises a first table for associating and storing a synchronization point ID embedded as watermark data with a scheduled timing for the synchronization point based on a synchronization reference timing for the main content, a second table for storing a scheduled start timing for first sub-content based on the synchronization reference timing, a detecting unit for detecting the synchronization point ID embedded as watermark data from second sub-content played back based on the progress of the main content, an acquiring unit for acquiring the scheduled timing for the synchronization point based on the detected synchronization point ID and the first table, and acquiring the difference between the scheduled timing of the acquired synchronization point and the detection timing for the synchronization point ID based on the synchronization reference timing, a determination unit for determining a start timing for the first sub-content based on the acquired difference and the second table, and a control unit for controlling playback of the first sub-content based on the determined start timing for the first sub-content; and the operator terminal comprises an input unit for receiving input related to the playback of the second sub-content from an operator, and a control unit for controlling playback of the second sub-content based on the content of the received input.

In the present invention, a "unit" may refer to either a physical means or a function of a unit realized by software. Also, the function of a single "unit" or device may be realized by two or more physical means or devices, and the functions of two or more "units" or devices may be realized by a single physical means or device.

Effect of the Invention

The present invention is able to provide a content playback program, content playback method, and content playback system for playing back other content on any timing without being restricted to the embedded timing of watermark data embedded in the content even when the progress time of the content fluctuates.

BRIEF DESCRIPTION OF DRAWINGS

FIG. 1 is a diagram showing the configuration of the content playback system in an embodiment of the present invention.

FIG. 2 is a diagram showing an example of the hardware configuration of the user terminal 200 and the operator terminal 100.

FIG. 3 is a diagram showing an example of the function configuration for the operator terminal 100.

FIG. 4 is a diagram showing an example of the function configuration for the user terminal 200.

FIG. 5 is a diagram showing an overview of the content playback process in the content playback system.

FIG. 6 is a diagram showing an overview of the content playback process in the content playback system.

FIG. 7 is a diagram showing an example of the table configuration in the content playback system.

FIG. 8 is a flowchart showing an example of the content playback processing in the user terminal 200.

FIG. 9 is a diagram showing an overview of an example of a content playback event.

FIG. 10 is a diagram showing an overview of the content playback controls in the content playback system for the event in FIG. 9.

FIG. 11 is a flowchart showing an example of the content playback control processing in the user terminal 200.

FIG. 12 is a diagram showing an overview of content playback controls in the content playback system.

EMBODIMENT OF THE INVENTION

The following is a description of a preferred embodiment of the present invention with reference to the appended drawings. In the drawings, components denoted by the same reference numbers have the same or similar configurations. In the following description, the time for each timing is denoted using the hh:mm:ss format (where hh is the hour, mm is the minute, and ss is the second). Note that the format used to express the timing is not limited to time information and may be expressed, for example, as timer values incremented in a fixed cycle.

In the following explanation, the content playback system in the embodiment (referred to simply as the "content playback system" below) is used for content including a live performance on stage. However, the embodiment is not limited to this particular example.

<1. System Overview>

FIG. 1 is a diagram showing the overall configuration of the content playback system. As shown in FIG. 1, this content playback system comprises an operator terminal 100, user terminals 200a, 200b and 200c (content playback devices, referred to collectively as "the user terminals 200" when they do not have to be distinguished from each other), and speakers 300a, 300b (referred to collectively as "the speakers 300" when they do not have to be distinguished from each other).

The speakers 300 are installed in the facility where the live performance is to be held, such as a theater or ballpark, and the operator terminal 100 is operated by a person (operator) to control the content outputted from the speakers 300 such as background music (for example, playing background music). The user terminals 200 are associated with playback of this content to play additional content such as subtitles or an audio guide. The performers performing live on the stage and the devices installed at the facility such as the operator terminal 100 and the speakers 300 are referred to collectively as "stage side."

In an example in which the content includes a live performance on a stage, sub-content such as background music (second sub-content) is played back by the operator on the operator terminal 100 as the content performed on the stage (the main content) progresses. The user terminals 200 automatically play additional sub-content such as subtitles (first sub-content) using two tables for reflecting the deviation from the scheduled progress in the live performance due to fluctuations therein while the background music is played back by the operator in accordance with the live performance. An overview of the content playback system in the present example will now be described with reference to (1) to (3) below. The content included in the content playback system, as mentioned above, is divided broadly into main content, first sub-content, and second sub-content. Each type of content will be described in detail below.

(1) In the live performance using the content playback system, a playback schedule is set before the performance for the background music and subtitles based on scheduled progress in the live performance, which is the main content, on the stage. Next, a synchronization point is set in a section of the performance during which the background music is played. More specifically, a synchronization point ID is embedded as watermark data in the playback timing for the section during which the background music is played referencing the synchronization reference timing such as the start time of the live performance. Setting the schedule and the synchronization point may entail registering setting information in the operator terminal 100 for the operator to edit when necessary.

Here, a "synchronization point" is a point used to synchronize progress of sub-content with progress of the main content. A "synchronization point ID" is identification information used to specify a synchronization point. The "synchronization reference timing" is the timing such as the start time for the live performance or the start time for a scene switch. In the following explanation, the synchronization reference timing uses the start time "00:00:00" of the main content.

(2) The user terminals 200 used in the content playback system store (an accessible) first table for associating and storing a synchronization point ID with the scheduled timing for a synchronization point referencing the synchronization reference timing, and second table for storing the schedule start timing for first sub-content such as subtitles to be played based on progress in the live performance referencing the synchronization reference timing.

(3) When the live performance (main content) has started on the date of the live performance, the stage-side operator monitors progress of the main content. When a delay occurs, the playback timing for the background music is adjusted accordingly. As a result, the background music is played on timing corresponding to actual progress in the live performance, and a synchronization point ID is outputted while the background music is being played. When the background music is received by the microphone in the user terminals 200, the synchronization point ID embedded in the background music is detected and the scheduled timing for the synchronization point is obtained based on the detected synchronization point ID and the first table. In the content playback system, the discrepancy between the scheduled timing for the acquired synchronization point and the detected timing of the synchronization point ID (that is, the deviation from the schedule due, for example, to a delay) is obtained, and the timing for actually starting the subtitles is determined based on the discrepancy and the second table to reflect the deviation from the scheduled progress in the live performance. In the content playback system, the subtitles are then played on the user terminal 200 based on the determined start timing.

In this configuration, playback of first sub-content can be controlled based on any timing not limited to the embedded timing of watermark data for second sub-content such as background music when main content such as a live performance experiences a fluctuation in the progress times.

In this configuration, playback of subtitles on user terminals 200 can be synchronized with progress on stage with only small errors without the operator having to perform any subtitle playback operation as the live performance progresses.

<2. Hardware Configuration>

FIG. 2 is a diagram showing an example of the hardware configuration of the operator terminal 100 and the user terminals 200 (referred to below simply as the "user terminal 200"). The user terminal 200 can be any terminal able to play back the first sub-content, such as a smartphone, tablet, notebook computer, desktop computer, or wearable terminal in the form of glasses or a wristband. As shown in FIG. 2, the user terminal 200 has a processor 110, a storage device 115, a communication interface (I/F) 120, an audio input device 125, an audio output device 130, an operation input device 135, and a display output device 140.

The processor 110 is a processing device for calculating, processing and transferring data, executing programs, and controlling other devices. The processor 110 can realize these functions in the user terminal 200 by executing a program stored in the storage device 115.

The storage device 115 stores programs and data and can be a primary storage device (such as volatile memory or random access memory), an auxiliary storage device (such as nonvolatile memory), or an external storage device.

The communication interface 120 is a device used to exchange programs and data with external devices. The communication interface 120 can be an interface for a mobile phone communication network or a wireless local area network (LAN). The communication interface 120 may also be a wired interface.

The audio input device 125 detects ambient sound. The audio input device 125 can be, for example, a microphone. The audio input device 125 can detect sound in the audible range or sound in the inaudible range. The audio input device 125 may also be external to the user terminal 200.

The audio output device 130 outputs audio. The audio output device 130 can be, for example, a speaker. The audio output device 130 can also output audio to an earphone. When the first sub-content includes audio (such as an audio guide or voice dubbing), the audio can be outputted to the audio output device 130.

The operation input device 135 receives operation input from the user or operator. The operation input device 135 can be a touch panel integrated into the display output device 140. The operation input device 135 may be external to the user terminal 200 such as a keyboard or mouse.

The display output device 140 displays video (including still images). The display output device 140 can be a liquid crystal display or organic electroluminescence (EL) display. The display output device 140 may also be external to the user terminal 200. When the first sub-content includes video (such as subtitles), the video can be outputted to the display output device 140 in the user terminal 200.

<3. Function Configuration>

<3.1 Function Configuration of Operator Terminal 100>

FIG. 3 is a diagram showing an example of the function configuration for the operator terminal 100. The operator terminal 100 includes an input unit 150, an output unit 155, a control unit 160, and a storage unit 165. Each unit shown in FIG. 3 can use a storage area in the storage device 115, and be realized by having the processor 110 execute a program (content playback program) stored in the storage device 115.

The input unit 150 receives various types of information inputted to the operator terminal 100. The input unit 150 can receive, for example, input related to the playback of second sub-content from the operator. The input unit 150 includes various types of input modes such as receiving input from a keyboard connected to the operator terminal 100 or audio inputted via a built-in microphone in the operator terminal 100.

The output unit 155 outputs various types of information on the operator terminal 100. The output unit 155 includes various types of output modes such as displaying information on a screen in the operator terminal 100 or outputting audio from a built-in speaker in the operator terminal 100. The output unit 155 may also output the second sub-content.

The control unit 160 controls playback of the second sub-content based on input received by the input unit 150.

The storage unit 165 may also store second sub-content. The storage unit 165 may also store operation data indicating operations performed by the operator.

<3.2 Function Configuration and Playback Control Mechanism of User Terminal 200>

The playback control mechanism for the content playback system will be explained first with reference to FIG. 5 and FIG. 6. In FIG. 5 and FIG. 6, the main content is a live performance on the stage. The second sub-content is BGM1 and BGM2 played during the live performance, and the first sub-content is subtitle 1 and subtitle 2 on the user terminal 200 aligned with the live performance and the background music.

Here, the progress time for the main content fluctuates. The main content can be a live play or dance performed by people or a live show using animals. The main content is referenced to control playback of the sub-content. The synchronization reference timing is set for the main content to serve as a reference for synchronizing playback of the sub-content.

The first sub-content is played back on a user terminal 200 based on progress of the main content. Examples of this type of sub-content include text data (such as subtitles or a guide), audio (such as music or an audio guide), video (such as sign language images or explanatory images), effects involving light or vibrations (such as flashing lights on the terminal, vibration of the terminal, or penlights connected to the terminal). When the main content is a live performance, the first sub-content may be text such as subtitles whose playback is linked to the live performance.

The second sub-content is content played back based on the progress of the main content with the first sub-content. The second sub-content can be played back on a device such as speakers 300 installed in a facility such as a theater based on an operation performed by the operator on the operator terminal 100. This sub-content can be audio (background music or sound effects), video (live video or background video), or a light show (spotlights and lasers). Watermark data for controlling playback of the first sub-content is embedded in the second sub-content so that playback of the first sub-content can be controlled based on playback of the second sub-content. The "watermark data" can be specific information (a "synchronization point ID" in the present example) embedded in video or music content using any electronic watermarking technology.

FIG. 5 shows the preset content playback schedule. In the example shown in FIG. 5, the live performance start time on the stage used as the synchronization reference timing is 00:00:00. BGM1 is scheduled to start playing at 00:05:00 and BGM2 is scheduled to start playing at 00:30:00.

In the user terminal 200, Subtitle 1 is scheduled to start playing at 00:12:00 and Subtitle 2 is scheduled to start playing at 00:43:00. In FIG. 5, the P in a circle denotes the point at which Subtitle 2 is to be started during the live performance ("point P" below). In the schedule, the timing for point P is scheduled to coincide with the scheduled start timing for Subtitle 2.

In FIG. 6, on the date of the live performance, the live performance is behind schedule on the stage because of a longer than anticipated performance by the performer (resulting in a one second delay in the present example). The schedule playback timing for the background music is corrected by the operator after the delay to be played five minutes later than originally scheduled. In FIG. 6, the playback timing for the background music after the delay is 00:35:00, which is five minutes later than the originally scheduled 00:30:00.

In FIG. 6, the content playback system in the user terminal 200 absorbs the delay in the performance and synchronizes Subtitle 2 with progress in the performance. More specifically, when the synchronization point ID for the watermark data embedded in BGM2 is ID:002 and is outputted along with BGM2, the user terminal 200: (1) detects the synchronization point ID; and (2) acquires the scheduled timing (00:30:00) for the synchronization point ID (ID:002) based on the detected synchronization point ID and on the first table in which the synchronization point ID has been associated with the scheduled timing for the synchronization point, and acquires the difference between the acquired scheduled timing and the timing (00:35:00) at which the synchronization point ID was detected. The user terminal 200 then (3) determines the start timing for Subtitle 2 (00:48:00), which reflects the difference relative to the preset scheduled start timing (00:43:00), and starts playback of Subtitle 2 at the new start timing.

In this configuration, playback of first sub-content such as subtitles can be started at the appropriate time aligned with the delayed progress in the main content such as a live performance when a delay occurs in the main content or live performance on stage and progress fluctuates from the schedule.

FIG. 4 is a diagram showing an example of the function configuration for the user terminal 200. The user terminal 200 includes a detecting unit 210, an acquiring unit 215, a determining unit 220, a control unit 225, and a storage unit 230. Each unit in FIG. 4 uses a storage area in the storage device 115, and the processor 110 can realize these units in the user terminal by executing a program (content playback program) stored in the storage device 115.

The detecting unit 210 detects a synchronization point ID embedded as watermark data from second sub-content played back based on progress in the main content.

The acquiring unit 215 acquires the timing for the synchronization point based on the synchronization point ID detected by the detecting unit 210 and the first table. The acquiring unit 215 acquires the difference between the timing for the acquired synchronization point and the timing at which the synchronization point ID was detected in reference to the synchronization reference timing.

The determining unit 220 determines the start timing for the first sub-content based on the difference acquired by the acquiring unit 215 and the second table.

The control unit 225 controls playback of the first sub-content based on the start timing for the first sub-content determined by the determining unit 220.

The storage unit 230 stores the first table and the second table. The storage unit 230 may also store the third table described later. Note that the storage unit 230 may use a file system or a database system such as RDB or NoSQL to store the tables. The storage unit 230 may also store the content playback program.

<Table Configuration>

The first table 410 and the second table 420 will now be described with reference to FIG. 7. In order to make the tables easier to understand, the information is associated directly and stored in a single table. However, the present invention is not limited to this table format. For example, information can be associated and stored indirectly across multiple tables.

As shown in FIG. 7, the first table 410 associates and stores synchronization point IDs 412 with scheduled synchronization timings 414. The first table 410, for example, associates and stores synchronization point ID 412 "001" with scheduled synchronization timing 414 "00:05:00" specified by the synchronization point ID. Note that the scheduled synchronization timing 414 may be set to any timing referencing the synchronization reference timing based on, for example, progress in the live performance or editing of the first sub-content for the main content. More specifically, the scheduled synchronization timing 414 may be set at intervals of five seconds, ten seconds, one minute etc. from the synchronization reference timing, and each BGM may be set to the timing at which playback starts.

The second table 420 stores the scheduled start timings 422 for the first sub-content with reference to the synchronization reference timing. The second table 420 may associate and store schedule start timings 422 with information indicating the first sub-content ("first sub-content information" below). First sub-content information can be, for example, identification information for specifying first sub-content. First sub-content information may include, for example, a first sub-content ID, the title of the first sub-content, the file name containing the first sub-content, and the file path. The second table 420 may associate and store, for example, the schedule start timing 422 for first sub-content (00:45:00) with the first sub-content information scheduled to start (video 1).

In addition to the units described above, the user terminal 200 may also include a content acquiring unit (not shown). The content acquiring unit may, for example, acquire the first sub-content to be controlled and played back by the user terminal 200 and the content playback program to be executed by the user terminal 200 via the internet or an external medium, and store the sub-content and the program in the storage unit 230. In the user terminal 200, the first sub-content does not have to be acquired by the content acquiring unit and stored in the storage unit 230. For example, the user terminal 200 may playback first sub-content stored in another terminal via a playback control message sent from the user terminal 200.

<4. Processing Flow>

FIG. 8 is a flowchart showing an example of the content playback processing in the user terminal 200. The processing shown in FIG. 8 can be triggered, for example, by an install request from the user for an application including the content playback program or the user launching such an application. The order of the processing below is just that of an example and may be changed when necessary.

As shown in FIG. 8, the user terminal 200 detects a synchronization point ID embedded as a watermark in second sub-content to be played back based on progress of the main content (S701).

The user terminal 200 then acquires the timing for the synchronization point based on the detected synchronization point ID and the first table (S702). Next, the user terminal 200 acquires the difference between the acquired scheduled timing at the synchronization point and the timing at which the synchronization point ID was detected with reference to the synchronization reference timing (S703). The user terminal 200 then determines the start timing for the first sub-content based on the acquired difference and the second table (S704).

Next, the user terminal 200 controls playback of the first sub-content based on the determined start timing for the first sub-content (S705).

The embodiment described above was provided so that the present invention could be easily understood, and should not be interpreted as limiting the present invention in any way. The arrangement, materials, conditions, shapes and sizes of the various component in the embodiment are for illustrative purposes only and can be changed when necessary. These can also be partially replaced or combined with components described in other embodiments.

(Modifications)

The present invention was described with reference to the embodiment provided above. However, the present invention is not limited to this embodiment. The present invention, for example, encompasses the following modifications as well.

(1) In the embodiment described above, the main content was a live performance whose progress time fluctuates. However, the present invention can also be applied to content such as movies and live video in which the progress time does not change substantially. For example, when the main content is a movie, the first sub-content may be subtitles for the movie. Even when the progress time of the main content does not change at all, there may be system delays between the device playing the main content, the operator terminal 100 and the user terminals 200. In this case, the delays between content can be substantially eliminated using the present invention. When the present invention is used in this way, playback control of the first sub-content is controlled with the difference between the detection timing at which a synchronization point ID was acquired according to the system time and the scheduled timing for the synchronization point associated with the synchronization point ID in the first table 410.

(2) In the embodiment described above, the control unit 225 controlled playback of the first sub-content based on the start timing determined by the determining unit 220. However, when at least one second sub-content is set as a prerequisite for the playback of the first sub-content, the first sub-content may be played back only on condition that the synchronization point ID embedded in the second sub-content has been detected.

The configuration of the control unit 225 in this modification will be explained with reference to FIG. 9 and FIG. 10. FIG. 9 is a diagram showing an overview of an example of a content playback event. FIG. 10 is a diagram showing an overview of the content playback controls in the content playback system for the event in FIG. 9.

As shown in FIG. 9, playback of first sub-content Subtitle 1 and Subtitle 2 is set so that playback of Subtitle 2 occurs automatically after Subtitle 1 in alignment with the timing of point P in a live performance and second sub-content BGM2. When a delay occurred in the live performance that is the main content (a three-minute delay in this example), Subtitle 2 is outputted to user terminal 200 at 00:20:00 before the synchronization point ID for second sub-content BGM2. When BGM2 is detected, the difference in the detection timing due to the delay is acquired and the start timing determined. As a result, Subtitle 2 is outputted again at 00:23:00. Here, "occurs automatically" means each process is started and executed in a user terminal 200 without a trigger such as a send message from the outside. For example, the playback time for each first sub-content is scheduled beforehand in a schedule and each first sub-content is played back in successive order based on the registered playback schedule.

For this event, as shown in FIG. 10, the control unit 225 presets BGM2 as second sub-content, which is a prerequisite for the playback of first sub-content Subtitle 2, so that Subtitle 2 is played back on condition that synchronization point ID:001 for BGM2 is detected by the detecting unit 210. As a result of this control process, playback of Subtitle 2 goes into standby when there is a delay in the progress of the live performance and Subtitle 2 is played back once the synchronization point ID for BGM2 has been detected. In this example, playback of the first sub-content occurs automatically but the first sub-content can be played back in alignment with second sub-content in response to progress of the main content even when playback of the main content is delayed. As a result, a content playback system can be provided that is easy for users to use.

FIG. 11 is a flowchart showing an example of content playback control processing performed by a control unit 225 with the configuration described above. As shown in FIG. 11, the user terminal 200 acquires the current time (for example, the system time in the user terminal 200) and determines whether there is first sub-content whose start timing is at the acquired current time (S711). This process is either event-driven or on a fixed cycle. When there is no first sub-content with this start timing (NO in S711), the process ends.

When there is first sub-content with this start timing (YES in S711), the user terminal 200 determines whether there is second sub-content, which is a prerequisite for the playback of the first sub-content (S712). When there is such second sub-content (YES in S712), it is determined whether the synchronization point ID embedded in the second sub-content has been detected (S713). When it has been determined that the synchronization point ID has been detected (YES in S713), the user terminal 200 plays the first sub-content based on the start timing for the first sub-content (S714). When it has been determined that the synchronization point ID has not been detected (NO in S713), the process ends.

When there is no second sub-content which is a prerequisite for the playback of the first sub-content (NO in S712), the user terminal 200 plays the first sub-content based on the start timing for the first sub-content (S714).

(3) In the embodiment described above, the watermark data detected by the detecting unit 210 may be data embedded in sound in the inaudible range. In this example, watermark data for a synchronization point ID embedded in sound can be outputted in a section in which second sub-content such as background music is not arranged so that the user remains unaware of the sound in the inaudible range.

(4) In the embodiment described above, content playback control was performed by the control unit 225 using a first table and a second table. However, the present invention may also include a third table for associating and storing synchronization point IDs with first sub-content information, and a second control unit 2 for controlling playback of first sub-content indicated by the first sub-content information associated with a synchronization point ID based on the detected synchronization point ID and the third table. For example, when the detected synchronization point ID is not stored in the second table but the detected synchronization point ID is stored in the third table, the second control unit controls playback of the first sub-content associated with a synchronization point ID based on the detected synchronization point ID and the third table.

In this configuration, (1) the first table 410 and the second table 420 are used in sections in which the first sub-content runs automatically as in the prior art, and (2) the first table 410 and the third table are used in sections in which the first sub-content is to be started in alignment with the playback timing of the second sub-content (the timing embedded in watermark data etc.). In this way, playback control can be realized for two different types of first sub-content. In this configuration, many different variations can be created for content playback control without the user having to input operations.

(5) In Modification (4), the third table is separate from the first table 410. However, it may also be merged with the first table 410 to create a single table. More specifically, the third table may be integrated with the first table 410 by providing three columns, one each for the first synchronization point ID serving as the main key, the scheduled synchronization timing, and the first sub-content information, or may be integrated by combining the column for the scheduled synchronization timing and the first sub-content information. In this configuration, the number of tables can be reduced and a more efficient content playback system can be realized.

(6) In the embodiment described above, the first sub-content (subtitles) were played back in series. However, as shown in FIG. 12, the first sub-content can be divided into first sub-content 1 and first sub-content 2 so that a user terminal 200 can simultaneously playback more than one first sub-content in parallel. In another example, one user terminal 200a can play back first sub-content 1 and another user terminal 200b can play back first sub-content 2 when more than one user terminal 200 is being used. Also, as shown in FIG. 12, synchronization point IDs "ID:001" and "ID:002" are set for BGM1 and synchronization point ID "ID:003" is set for BGM2. Here, there is no 1:1 correspondence between second sub-content units and the number of synchronization points set. This allows one-to-many, many-to-one and many-to-many correspondences to be used.

In this configuration, first sub-content can be flexibly played back several times by a user terminal 200 using watermark data once, and a highly scalable content playback system can be provided.

(7) While not depicted in the embodiment described above, a user terminal 200 may also use a light-emitting device such as a warning light or an LED light on a smartphone. When first sub-content includes a light show, some of the light in the performance can be emitted by the light-emitting device. In this configuration, a content playback system can be provided that can utilize user terminals 200 to realize various types of effects in a venue in alignment with progress in the main content, and that users may find interesting.

(8) In the embodiment described above, electronic watermarks are used to detect synchronization point IDs. However, audio fingerprinting technology may also be used. Audio fingerprinting technologies are digital audio signal processing technologies that electronically extract audio waveform features from original digital sound sources and to use extracted features smaller than the original sound source as (fingerprint) data. In the content playback system, audio waveform features from sound received by the audio input terminal 125 are extracted and checked against audio waveform learning data stored in the storage device 115 to detect a synchronization point ID.

In this configuration, a distinctive feature obtained from the original second sub-content can be used to detect a synchronization point without having to embed watermark data in the second sub-content. In this way, a general-purpose content playback system can be provided.

Key to the Drawings
   100: Operator terminal
   110: Processor
   115: Storage device
   120: Communication interface
   125: Audio input device
   130: Audio output device
   135: Operation input device
   140: Display output device
   150: Input unit
   155: Output unit
   160: Control unit

165: Storage unit
200, 200a, 200b, 200c: User terminals
210: Detecting unit
215: Acquiring unit
220: Determining unit
225: Control unit
230: Storage unit
300, 300a, 300b: Speakers
410: First table
420: Second table

The invention claimed is:

1. A content playback program stored on a non-transitory computer readable medium of a computer, wherein the execution of the content playback program causes the computer to perform a method comprising:
   utilizing a first table for associating and storing a synchronization point ID embedded as watermark data with a scheduled timing for the synchronization point based on a synchronization reference timing for the main content;
   utilizing a second table for storing a scheduled start timing for first sub-content based on the synchronization reference timing;
   detecting the synchronization point ID embedded as watermark data from second sub-content played back based on the progress of the main content;
   acquiring the scheduled timing for the synchronization point based on the detected synchronization point ID and the first table, and acquiring the difference between the scheduled timing of the acquired synchronization point and the detection timing for the synchronization point ID based on the synchronization reference timing;
   determining a start timing for the first sub-content based on the acquired difference and the second table; and
   controlling playback of the first sub-content based on the determined start timing for the first sub-content,
   wherein the scheduled timing for the synchronization point is a scheduled playback timing of the synchronization point in the second sub-content and is acquired based on the detected synchronization point ID embedded as the watermark data in the second sub-content and the first table for associating and storing the synchronization point ID with the scheduled playback timing of the synchronization point.

2. The content playback program according to claim 1, wherein controlling playback of the first sub-content is based on condition that the synchronization point ID embedded in the premised second sub-content is detected when at least one second sub-content has been set as a prerequisite for the playback of the first sub-content.

3. The content playback program according to claim 1, wherein the watermark data includes data embedded in sounds in the non-audible area.

4. The content playback program according to claim 1, wherein the main content includes a live performance, the first sub-content is text data to be played back based on the progress of the main content along with the second sub-content, and the second sub-content is music to be played back based on the progress of the main content.

5. The content playback program according to claim 3, wherein the execution of the content playback program causes the computer to perform a method comprising:
   utilizing a third table for associating and storing the synchronization point ID with information indicating the first sub-content; and
   controlling playback of the first sub-content indicated in the information associated with the synchronization point ID based on the detected synchronization point ID and the third table when the synchronization point ID has been detected by the detection function.

6. A content playback method comprising:
   associating and storing a synchronization point ID embedded as watermark data with a scheduled timing for the synchronization point based on a synchronization reference timing for the main content in a first table;
   storing a scheduled start timing for first sub-content based on the synchronization reference timing in a second table;
   detecting the synchronization point ID embedded as watermark data from second sub-content played back based on the progress of the main content;
   acquiring the scheduled timing for the synchronization point based on the detected synchronization point ID and the first table, and acquiring the difference between the scheduled timing of the acquired synchronization point and the detection timing for the synchronization point ID based on the synchronization reference timing;
   determining a start timing for the first sub-content based on the acquired difference and the second table; and
   controlling playback of the first sub-content based on the determined start timing for the first sub-content,
   wherein the scheduled timing for the synchronization point is a scheduled playback timing of the synchronization point in the second sub-content and is acquired based on the detected synchronization point ID embedded as the watermark data in the second sub-content and the first table for associating and storing the synchronization point ID with the scheduled playback timing of the synchronization point.

7. A content playback system comprising a user terminal and an operator terminal, wherein
   the user terminal comprises a memory and a processor, the memory comprising:
      a first table that associates and stores a synchronization point ID embedded as watermark data with a scheduled timing for the synchronization point based on a synchronization reference timing for the main content, and
      a second table that stores a scheduled start timing for first sub-content based on the synchronization reference timing,
   the processor being configured to cause the user terminal to perform:
      detecting the synchronization point ID embedded as watermark data from second sub-content played back based on the progress of the main content,
      acquiring-the scheduled timing for the synchronization point based on the detected synchronization point ID and the first table, and acquiring the difference between the scheduled timing of the acquired synchronization point and the detection timing for the synchronization point ID based on the synchronization reference timing, and
      determining a start timing for the first sub-content based on the acquired difference and the second table, and a control unit for controlling playback of the first sub-content based on the determined start timing for the first sub-content; and
   the operator terminal comprises a processor being configured to cause the operator terminal to perform:
      receiving input related to the playback of the second sub-content from an operator, and
      controlling playback of the second sub-content based on the content of the received input, wherein the scheduled timing for the synchronization point is a scheduled playback timing of the synchronization point in the second sub-content and is acquired based on the detected synchronization point ID embedded as the watermark data in the second sub-content and the first table for associating and storing the synchronization point ID with the scheduled playback timing of the synchronization point.

8. The content playback program according to claim 2, wherein the watermark data includes data embedded in sounds in the non-audible area.

9. The content playback program according to claim 2, wherein the main content includes a live performance, the first sub-content is text data to be played back based on the progress of the main content along with the second sub-content, and the second sub-content is music to be played back based on the progress of the main content.

10. The content playback program according to claim 3, wherein the main content includes a live performance, the first sub-content is text data to be played back based on the progress of the main content along with the second sub-content, and the second sub-content is music to be played back based on the progress of the main content.

* * * * *